United States Patent
Hoyer

(10) Patent No.: US 9,081,848 B2
(45) Date of Patent: Jul. 14, 2015

(54) METHODS, APPARATUSES, AND COMPUTER PROGRAM PRODUCTS FOR PREPARING NARRATIVES RELATING TO INVESTIGATIVE MATTERS

(71) Applicant: William Christian Hoyer, Lutz, FL (US)

(72) Inventor: William Christian Hoyer, Lutz, FL (US)

( * ) Notice: Subject to any disclaimer, the term of this patent is extended or adjusted under 35 U.S.C. 154(b) by 0 days.

(21) Appl. No.: 13/705,947

(22) Filed: Dec. 5, 2012

(65) Prior Publication Data

US 2013/0151532 A1    Jun. 13, 2013

Related U.S. Application Data

(60) Provisional application No. 61/569,330, filed on Dec. 12, 2011.

(51) Int. Cl.
*G06F 17/30* (2006.01)
(52) U.S. Cl.
CPC .... *G06F 17/30598* (2013.01); *G06F 17/30705* (2013.01); *G06F 17/30719* (2013.01)
(58) Field of Classification Search
CPC ................................................ G06F 17/30705
See application file for complete search history.

(56) References Cited

U.S. PATENT DOCUMENTS

| | | | | |
|---|---|---|---|---|
| 8,463,789 B1* | 6/2013 | Joshi et al. | | 707/738 |
| 2005/0058978 A1* | 3/2005 | Benevento, II | | 434/362 |
| 2005/0203768 A1* | 9/2005 | Florance et al. | | 705/1 |
| 2005/0283474 A1* | 12/2005 | Francis et al. | | 707/5 |
| 2012/0278401 A1* | 11/2012 | Meisels et al. | | 709/206 |

* cited by examiner

*Primary Examiner* — Neveen Abel Jalil
*Assistant Examiner* — Michael K Tamaru
(74) *Attorney, Agent, or Firm* — Womble Carlyle Sandridge & Rice, LLP

(57) ABSTRACT

An apparatus categorizes knowledge elements that an investigator derives from source materials into issue categories. The issue categories may be predefined based on the type or nature of the investigative matter or user-defined as circumstances dictate. The apparatus also allows for preparation of a narrative based on the knowledge elements and source materials. A hopper allows a user to view and access the categorized knowledge elements during preparation of the narrative. Accordingly, through this collaboration process, investigators may produce a narrative more accurately and efficiently. Further, the apparatus links the text in the narrative back to the knowledge elements and the source materials which may be easily accessed via the links to enable them to be reviewed to determine whether the relevant text in the narrative is firmly based thereon. Thus, review of the work product created with the apparatus may be simplified.

24 Claims, 9 Drawing Sheets

FIG. 6

METHODS, APPARATUSES, AND COMPUTER PROGRAM PRODUCTS FOR PREPARING NARRATIVES RELATING TO INVESTIGATIVE MATTERS

CROSS-REFERENCE TO RELATED APPLICATIONS

This application claims the benefit of U.S. Provisional Application No. 61/569,330 filed Dec. 12, 2011, which is entirely incorporated herein by reference.

BACKGROUND OF THE DISCLOSURE

1. Field of the Disclosure

Aspects of the present disclosure relate to the capture and processing of knowledge and source materials and their subsequent inclusion in narratives, and, more particularly, to methods, apparatuses, and computer program products for collaboratively capturing and processing knowledge and source materials and drafting narratives based thereon.

2. Description of Related Art

The investigative process in its broadest sense in any given context (e.g., legal, audit, forensic, security, research, media, etc) has remained substantially static for a number of years. Typically the investigative process starts after the occurrence of an event such as an incident, a complaint, or the creation of a hypothesis or theory to be tested. Then, the investigative process proceeds iteratively with research, data capture, analysis, and the forming of conclusions. Ultimately a work product such as an oral or written report is produced.

Up to the present time, the investigative process has remained largely unchanged. However, relatively new issues, such as the impact of technology, may negatively affect the efficacy of the traditional investigative process. For example, the volume, types, and forms of data now involved in investigative matters have increased significantly over the last few years. Investigative matters now routinely involve research and processing of electronic data including documents, audio, video, internet pages, etc. and in recent times social media has added significantly to the data pool for consideration in an investigation.

Furthermore, the complexity of investigative matters has increased. For example, investigative matters such as fraud may relate to issues concerning complex financial instruments, and could involve entities and investigators around the world. Consequently, the number of people involved in such an investigation, and the skill sets and language requirements thereof have also increased, and in addition, with people changing jobs more often, staff turnover also plays a part in increasing the number of investigators involved in investigative matters. As a result of these and other factors, the duration of investigative matters has increased, and even relatively straightforward legal cases now may span several years or more.

Accordingly, in light of the above-mentioned adverse factors, investigative matters are presently experiencing numerous challenges that hinder the effectiveness of the traditional investigative process, and in particular impact the ability of the investigating entity to maintain the collective investigators' memory over the course of the investigative matter. Further, the ability of the investigating entity to rapidly produce a status report or other output describing the current status of an investigative matter at any point during the investigation is also hindered by the above-mentioned adverse factors. Accordingly, the traditional investigative process now suffers from numerous deficiencies.

BRIEF SUMMARY OF THE DISCLOSURE

The above and other needs are met by aspects of the present disclosure, wherein one such aspect relates to an apparatus that enables knowledge elements created by an investigator from source materials to be captured easily, associated with one or more particular investigations and, within an investigation, collected together in issue categories that relate to, for example, the key elements of the investigative matter sought to be solved and/or proved. The issue categories may be predefined, for example at the commencement of the investigation, based on the typical issues associated with that particular type of investigative matter, or created by investigators during the course of the investigation, as circumstances require. The apparatus may also allow for preparation and subsequent updates of narratives based on the source materials and knowledge elements added by investigators so the narrative grows organically over the course of an investigative matter. Further, the apparatus links the text in a narrative back to the underlying knowledge elements and/or source materials on which the narrative is based. Accordingly, investigators in a team on an investigative matter may share and collaborate on knowledge elements, source materials and narrative updates, and in doing so, efficiently and accurately produce narratives that are current and reflect the collective knowledge of the team. In addition, due to the links from the narrative back to the source materials and/or the knowledge elements on which the narrative is based, the narrative may be quickly reviewed to determine whether the narrative and updates to it are firmly based on the knowledge elements and/or source materials and are fairly and completely extracted into the narrative. Thus, review of the work product created in the apparatus may be simplified and the work product may be reviewed easily such that management may direct or redirect an investigative matter as may be appropriate on an ongoing basis during the course of an investigation.

In this regard, in one aspect a method for conducting an investigative matter is provided. The method may comprise providing for categorization of a knowledge element derived from a source material into one or more issue categories to produce a categorized knowledge element, providing for preparation of a narrative based at least in part on the categorized knowledge element, providing for linking a portion of the narrative to the knowledge element or the underlying source materials the portion is based upon, and outputting the knowledge element upon selection of the portion of the narrative that is linked thereto via a processor.

In another aspect an apparatus is provided. The apparatus may comprise at least one processor and at least one memory including computer program code. The at least one memory and the computer program code may be configured to, with the processor, cause the apparatus to provide for categorization of a knowledge element derived from a source material into one or more issue categories to produce a categorized knowledge element, provide for preparation of a narrative based at least in part on the categorized knowledge element, provide for linking a portion of the narrative to the knowledge element or the underlying source materials the portion is based upon, and output the knowledge element upon selection of the portion of the narrative that is linked thereto.

In an additional aspect a computer program product is provided. The computer program product may comprise at least one computer-readable storage medium having computer-executable program code portions stored therein. The computer-executable program code portions may comprise program code instructions providing for categorization of a knowledge element derived from a source material into one or more issue categories to produce a categorized knowledge element, program code instructions providing for preparation of a narrative based at least in part on the categorized knowledge element, program code instructions providing for linking a portion of the narrative to the knowledge element or the underlying source materials the portion is based upon, and program code instructions for outputting the knowledge element upon selection of the portion of the narrative that is linked thereto.

In a further aspect an apparatus comprising means providing for categorization of a knowledge element derived from a source material into one or more issue categories to produce a categorized knowledge element, means providing for preparation of a narrative based at least in part on the categorized knowledge element, means providing for linking a portion of the narrative to the knowledge element or the underlying source materials the portion is based upon, and means for outputting the knowledge element upon selection of the portion of the narrative that is linked thereto is provided.

In some embodiments the above-described method may further comprise providing for selection of the issue categories from a predefined list. Also, the method may further comprise providing for linking the knowledge element to the source material. Additionally, the method may further comprise providing for indicating whether the knowledge element is referenced in the narrative. The method may also include providing for confirmation and questioning of the knowledge element. Additionally, the method may include providing for selection of the issue categories and outputting the categorized knowledge element included in a selected one of the issue categories. Further, embodiments of the above-described computer program product and apparatuses may include additional components, program code instructions, and means for performing these additional steps.

Aspects of the present disclosure thus address the identified needs and provide other advantages as otherwise detailed herein.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

FIG. 6 illustrates a screenshot of a user interface showing an input interface for inputting knowledge elements according to an example embodiment of the present disclosure;

Figure 9:
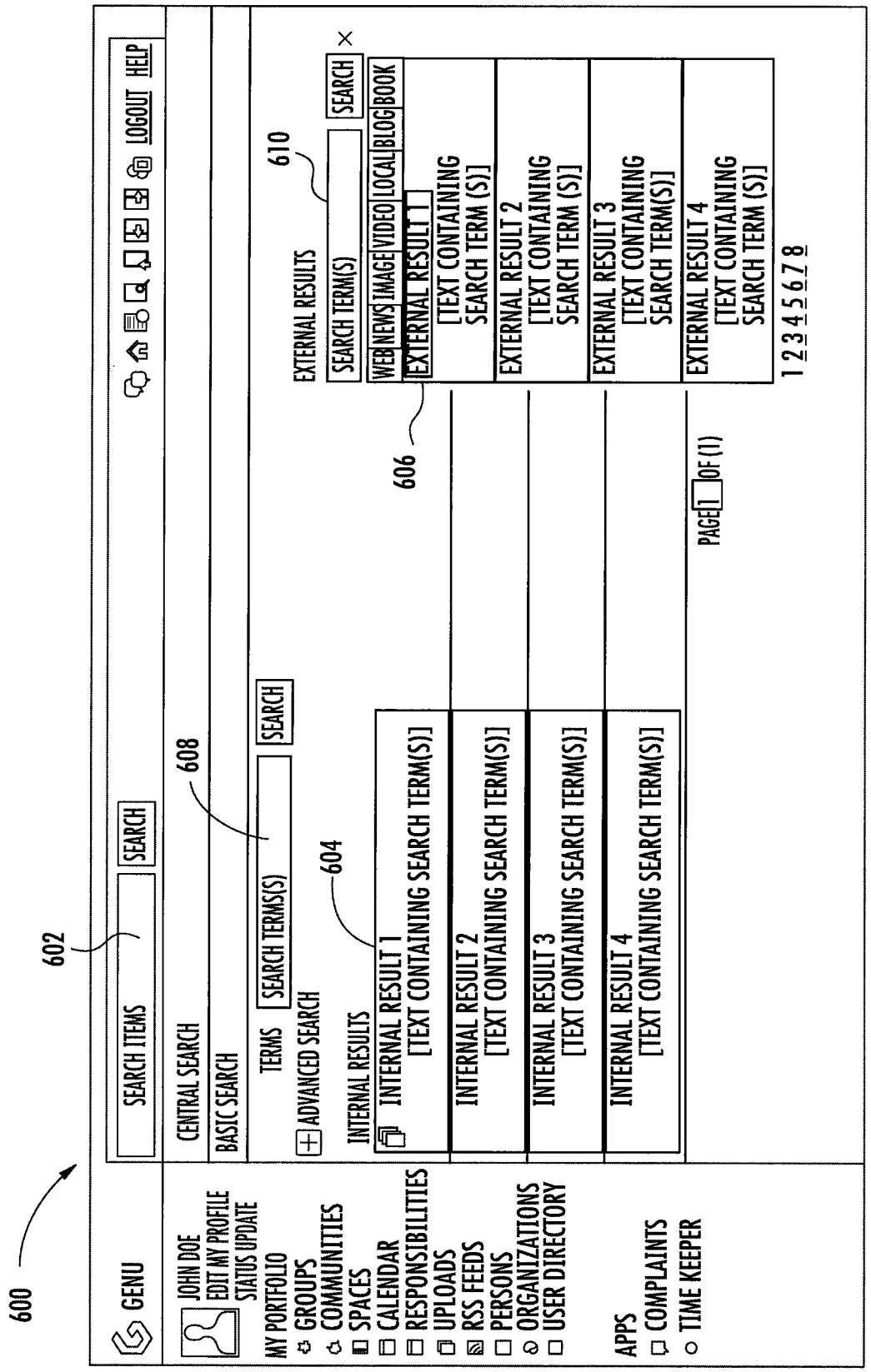
Figure 10:
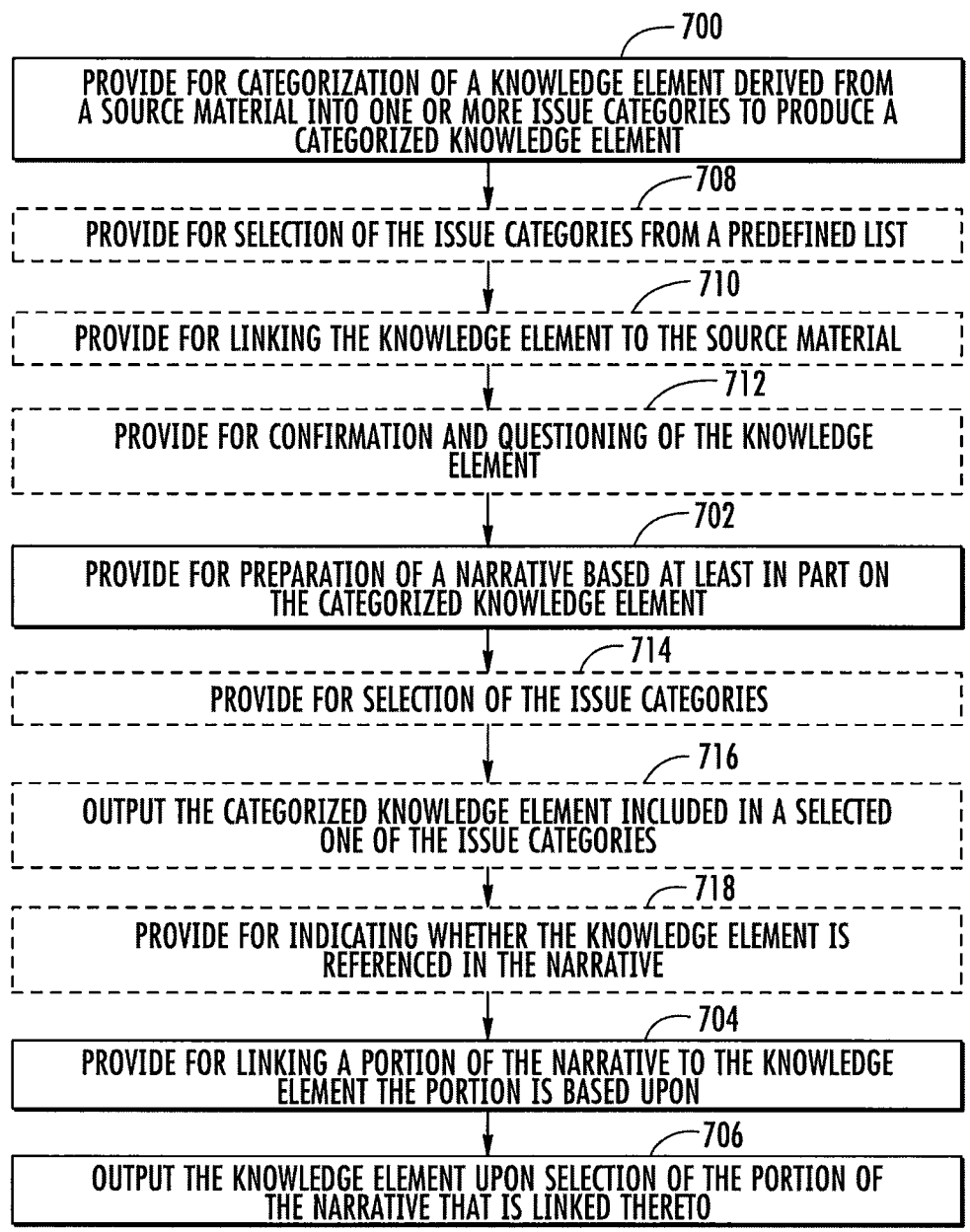

FIG. 9 illustrates a screenshot of a user interface showing a search page for internal and external searching according to one aspect of the present disclosure; and FIG. 10 illustrates a flowchart of the operations performed in linking a portion of a narrative to a categorized knowledge element and/or source material upon which the portion of the narrative is based according to an example embodiment of the present disclosure.

DETAILED DESCRIPTION OF THE DISCLOSURE

The present disclosure now will be described more fully hereinafter with reference to the accompanying drawings, in which some, but not all aspects of the disclosure are shown. Indeed, the disclosure may be embodied in many different forms and should not be construed as limited to the aspects set forth herein; rather, these aspects are provided so that this disclosure will satisfy applicable legal requirements. Like numbers refer to like elements throughout.

As used herein, a computer-readable storage medium refers to a non-transitory, physical storage medium (e.g., a volatile or non-volatile memory device) and can be differentiated from an electromagnetic signal.

As described herein, embodiments of the disclosure relate to systems, methods, apparatuses, and computer program products for conducting investigative matters, and preparing outputs relating thereto in the form of research papers, briefs, dissertations, theses, memos, complaints, and/or other items referred to herein as a "narrative." The narrative may be built up directly from source materials. "Source materials," as used herein, refers to primary sources of information in any of a variety of formats, including one or more of text, audio, video, etc. The narrative may also be built up from "knowledge elements," which refers to processed information based on source materials. The knowledge elements may be extracted from a variety of forms of source materials such as documents, electronic files, websites, and intangible sources such as unrecorded phone conversations and observations by an investigator. In some embodiments the narrative may incorporate multiple formats of data, including, for example, text with embedded images, audio, and/or video. In other embodiments the knowledge element may comprise a personal thought, theory, or conclusion. In such instances, the source material may comprise an observation or any other impetus leading thereto.

In order to deal with the challenges facing present-day investigative matters, applicants herein provide solutions that may be employed in a variety of types of investigative matters to prepare narratives. For example, the solutions provided herein may be applicable to investigative matters in a variety of contexts including: legal (e.g., civil and criminal defense and prosecution), corporate (e.g., pharmaceutical research), academic (e.g., research and thesis preparation), journalism (e.g., news articles and editorials), forensic accounting (e.g., financial account review), and audits (e.g., tax audits).

Accordingly, the solutions provided herein may be useful to a variety of entities, including, e.g., legal, corporate, academic, journalistic, accounting and auditing entities. However, for purposes of brevity, the solutions provided herein are generally discussed by way of examples in terms of applicability to investigative matters conducted in preparation for, and/or during, legal cases.

In this regard, a significant impediment to present-day investigative matters is that numerous investigators may play roles in the ultimate creation of a narrative on a particular investigation. Accordingly, embodiments of the present disclosure provide for creation, sharing, collaborative input on, review, and editing of knowledge elements, source materials, and the narrative itself relevant to an investigative matter. For example, the system disclosed herein may be embodied electronically and accessible via a network (e.g., via the internet or an intranet) such that each investigator may have access to the system. Accordingly, investigators may access the system via a variety of devices, including smartphones, tablets, laptops, personal computers, etc., regardless of the particular operating system running thereon.

Further, in order to ensure that the information on the system is up-to-date, the system may operate in real-time. In this regard, as an investigator uploads, creates, edits, or otherwise makes changes to the data on the system, these changes may be substantially instantaneously reflected on the system and visible to the other investigators so enabled according to their role and/or any access permissions afforded to them. Accordingly, through this integration and cohesion of investigative efforts, investigative team members may all be aware of the present status of the investigative matter at all times.

Another problem associated with present-day investigative matters is that the investigative period may extend for multiple years, and there may be turnover in terms of the investigators staffing the investigative matters. Further, investigative matters may relate to complex issues including international investigative matters and intricate financial elements such as derivatives. Therefore, the ability of investigators to remember key knowledge elements and source materials and properly apply these knowledge elements and source materials to the issues at hand so that they are accurately reflected in the narrative at any point during an investigation may be hampered. In addition, the relevance of knowledge elements and source materials to an investigative matter may change over time and thus the system provided herein may categorize and store knowledge elements and source materials such that they are readily accessible to investigators during the course of an investigative matter. Accordingly, the system disclosed herein is configured to address the challenges associated with conducting present-day investigative matters.

The system may be embodied in a number of forms, and include a variety of functions. Accordingly, although various particular embodiments and functionalities are disclosed herein, it should be understood that this description is provided for example purposes only. In other embodiments the system may perform additional or fewer functions and/or be embodied in differing forms.

Figure 1:
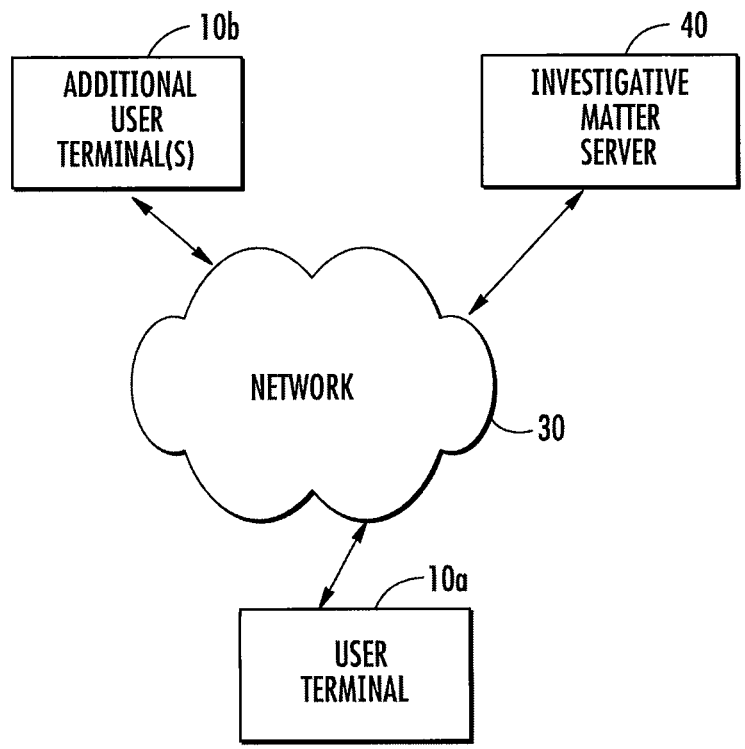
FIG. 1 illustrates a schematic block diagram of a system according to an example embodiment of the present disclosure.

In this regard, by way of example, FIG. 1 illustrates a block diagram of a system that may benefit from embodiments of the present disclosure. It should be understood, however, that the system as illustrated and hereinafter described is merely illustrative of one system of the present disclosure and, therefore, should not be taken to limit the scope of embodiments of the present disclosure.

As shown in FIG. 1, a system in accordance with an example embodiment of the present disclosure may include a user terminal 10a. The user terminal 10a may be any of multiple types of stationary or mobile communication and/or computing devices, which employ an embodiment of the present disclosure. In some embodiments the user terminal 10a may be capable of communicating with other devices, either directly, or via a network 30 (e.g., a local network or the internet). In turn, other devices such as personal computers, server computers or the like may be included in or coupled to the network 30. By directly or indirectly connecting the user terminal 10a and the other devices to the network 30, the user terminal 10a and/or the other devices may be enabled to communicate with each other, to carry out various communication or other functions of the user terminal and the other devices, respectively. The user terminal 10a and the other devices may be configured to communicate with the network 30 and/or each other by any of numerous different access mechanisms.

The user terminal 10a may be configured to provide for preparation of a narrative and conduct various other related functions as disclosed herein. In this regard, a user may employ the user terminal 10a to input and/or process data associated with an investigative matter. The system may further include one or more additional user terminal(s) 10b. The additional user terminal(s) 10b may be configured to perform some or all of the functions performed by the user terminal 10a.

The system may further include an investigative matter server 40 in some embodiments. The investigative matter server 40 may be configured to store source materials, knowledge elements, narratives and/or other information associated with investigative matters. In this regard, as noted above, the creation of a narrative and various other tasks associated with an investigative matter may be distributed amongst a plurality of individuals. The information created during the course of an investigative matter may be stored by the investigative matter server 40 and the users may employ the user terminal 10a and/or the additional user terminals 10b (collectively, the "user terminals 10") to upload, access, modify, create, and/or perform various other functions with respect to information on the investigative matter server. Accordingly, by providing each user with access to the information on the investigative matter server 40 depending on individual roles and/or permissions as discussed below, investigative matters may be collaboratively conducted to produce narratives. Although referenced herein as a "server," the narrative creation server 40 may be embodied as a server, server bank or other computer, computing device, cloud, or node configured to store the narrative and/or information associated with the investigative matter.

Figure 2:
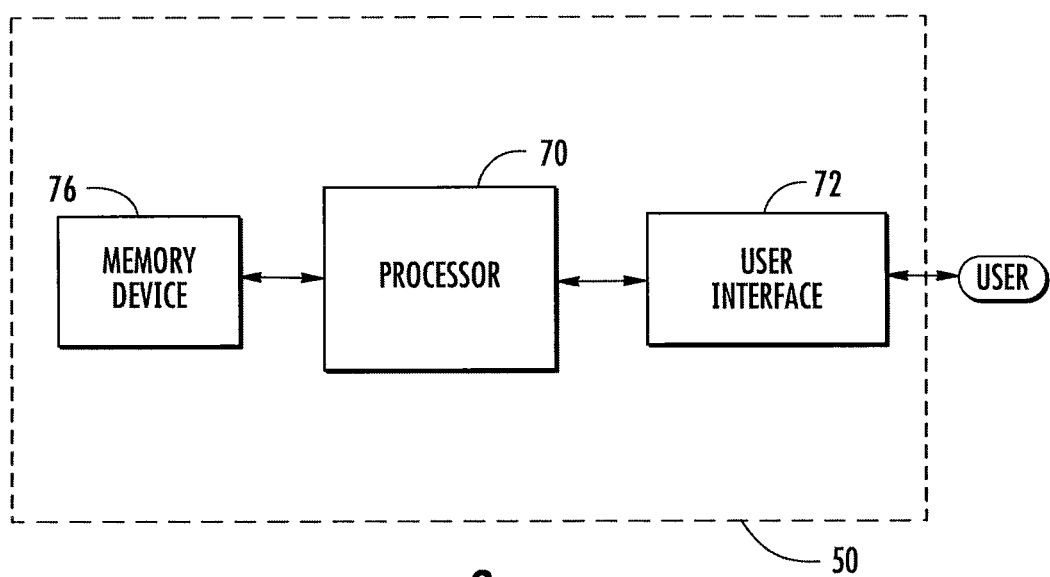
FIG. 2 illustrates a schematic block diagram of an apparatus configured to link a portion of a narrative to a categorized knowledge element upon which the portion of the narrative is based according to an example embodiment of the present disclosure.
Figure 3:
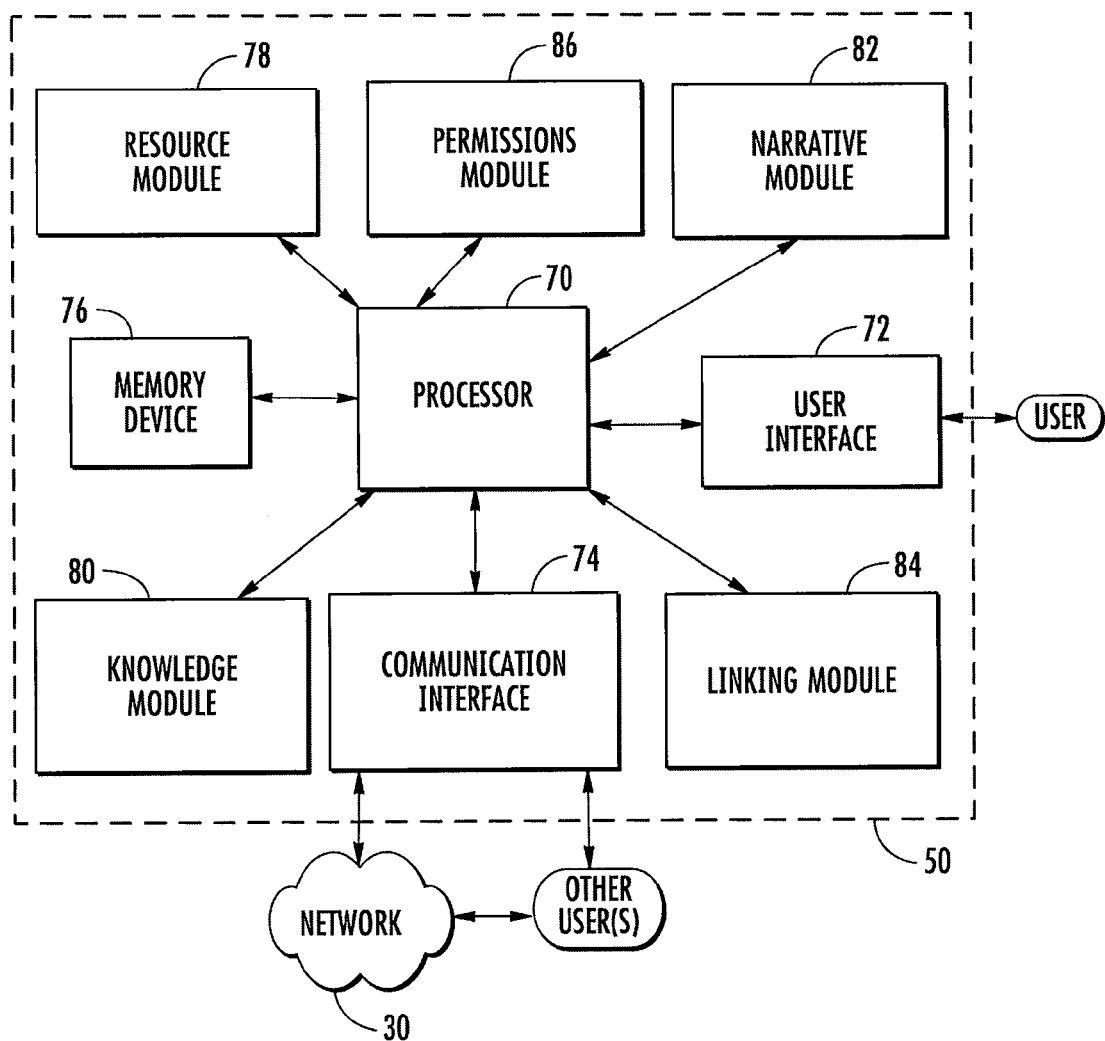
FIG. 3 illustrates a schematic block diagram of the apparatus of FIG. 2 including additional components configured to link a portion of a narrative to a categorized knowledge element and/or source material upon which the portion of the narrative is based according to an example embodiment of the present disclosure.

In example embodiments illustrated in FIGS. 2 and 3, an apparatus 50 is provided that may be employed by devices performing functions in accordance with example embodiments of the present disclosure. The apparatus 50 may be embodied, for example, as any device hosting, including, controlling, comprising, or otherwise forming a portion of the user terminal 10a, the user terminals 10b, and/or the narrative creation server 40. However, embodiments of the apparatus 50 may also be embodied on a plurality of other devices such as for example where instances of the apparatus may be embodied on the network 30. As such, embodiments of the apparatus 50 illustrated in FIGS. 2 and 3 are merely examples and may include more, or in some cases, less than the components shown in FIGS. 2 and 3.

With further regard to FIGS. 2 and 3, the apparatus 50 may be configured to provide for linking a portion of a narrative to a knowledge element and/or a source material that the portion of the narrative is based upon and perform related functions, as described in greater detail below. As depicted in FIG. 2, the apparatus 50 may include or otherwise be in communication with a processor 70, a user interface 72, and a memory device 76. The memory device 76 may include non-transitory and tangible memory that may be, for example, volatile and/or non-volatile memory. The memory device 76 may be configured to store information, data, files, applications, instructions or the like. For example, the memory device 76 could be configured to buffer input data for processing by the processor 70. Additionally or alternatively, the memory device 76 could be configured to store instructions for execution by the processor 70.

As mentioned above, the apparatus 50 may, in some embodiments, be a user terminal or a fixed communication device or computing device such as a server configured to employ an example embodiment of the present disclosure. However, in some embodiments, the apparatus 50 may be physically embodied as a chip or chip set. The chip or chipset may constitute means for performing one or more operations for providing the functionalities described herein.

The processor 70 may be embodied in a number of different ways. For example, the processor 70 may be embodied as one or more of various processing means such as a coprocessor, a microprocessor, a controller, a digital signal processor (DSP), processing circuitry, or various other processing devices including integrated circuits such as, for example, a special-purpose computer chip, or other hardware processor. In an example embodiment, the processor 70 may be configured to execute instructions stored in the memory device 76 or otherwise accessible to the processor. Alternatively or additionally, the processor 70 may be configured to execute hard coded functionality. As such, the processor 70 may be capable of performing operations according to embodiments of the present disclosure while configured accordingly. Alternatively, when the processor 70 is embodied as an executor of software instructions, the instructions may specifically configure the processor to perform the operations described herein. The processor 70 may include a clock, an arithmetic logic unit (ALU) and logic gates configured to support operation of the processor, amongst other components.

The user interface 72 may be in communication with the processor 70 to receive an indication of a user input at the user interface and/or to provide an audible/visible, mechanical (e.g., haptic) or other output to the user. As such, the user interface 72 may include, for example, a keyboard, a mouse, a joystick, a display/monitor, a touch screen, a microphone, a speaker, and/or other input/output mechanisms. The processor 70 may be configured to control at least some functions of one or more elements of the user interface 72.

As mentioned above, embodiments of the apparatus 50 may include more, or in some cases less, than the components shown in FIG. 2. In this regard, FIG. 3 illustrates an embodiment of the apparatus 50 comprising additional components or modules configured to provide for linking a portion of a narrative to a knowledge element and/or a source material that the portion of the narrative is based upon and perform related functions as discussed in detail below. The apparatus 50 may include or otherwise be in communication with the processor 70, the user interface 72, and the memory device 76 as described above with respect to FIG. 2.

In some embodiments the apparatus 50 may further comprise a communication interface 74. The communication interface 74 may be any means such as a device or circuitry embodied in either hardware, software, or a combination thereof that is configured to receive and/or transmit data. In this regard, the communication interface 74 may include, for example, an antenna and supporting hardware and/or hardwired components and/or software.

In some embodiments the apparatus 50 may further comprise a resource module 78. The resource module 78 may be configured to perform one or more functions with respect to inputting source material and performing related functions as described below in detail. In this regard, the apparatus 50 may be employed to create narratives ultimately derived from the source material. The processor 70 may be embodied as, include or otherwise control the resource module 78.

In some embodiments the apparatus 50 may further comprise a knowledge module 80. The knowledge module 80 may be configured to perform one or more functions with respect to providing for categorization of knowledge elements, which may be derived from source materials, and performing related functions as described below in detail. The processor 70 may be embodied as, include or otherwise control the knowledge module 80.

In some embodiments the apparatus 50 may further comprise a narrative module 82. The narrative module 82 may be configured to perform one or more functions relating to providing for preparation of a narrative as described below in detail. The processor 70 may be embodied as, include or otherwise control the narrative module 82.

In some embodiments the apparatus 50 may further comprise a linking module 84. The linking module 84 may be configured to perform one or more functions with respect to providing for linking the narrative to the knowledge elements and/or the source materials, and linking the knowledge elements to the source materials. The processor 70 may be embodied as, include or otherwise control the linking module 84.

In some embodiments the apparatus 50 may further comprise a permissions module 86. The permissions module 86 may be configured to perform one or more functions with respect to controlling access to information, ability to create and modify information, and ability to make changes and decisions. The processor 70 may be embodied as, include or otherwise control the permissions module 86. The permissions may be set based on user roles, based on whether or not an investigator is associated with an investigation, etc. Permissions to access and/or otherwise interact with source materials, knowledge elements, and the narrative may be set based on an individual user level (e.g., with a certain user not allowed access to a specified source material), or based on the various other factors noted above.

In one embodiment of the system, the user interface 72 may be employed to allow a user to interact with the apparatus 50 and complete an investigative matter. Further, in some embodiments multiple users may interact with the apparatus 50 to collaboratively complete the investigative matter. For example, as noted above, the apparatus 50 may be embodied all or in part in the user terminals 10, and each user may interact with the system through a respective user interface 72 associated therewith. One screen of the user interface 72 may allow the user to select categories of investigative matters and particular investigative matters therein.

Figure 4:
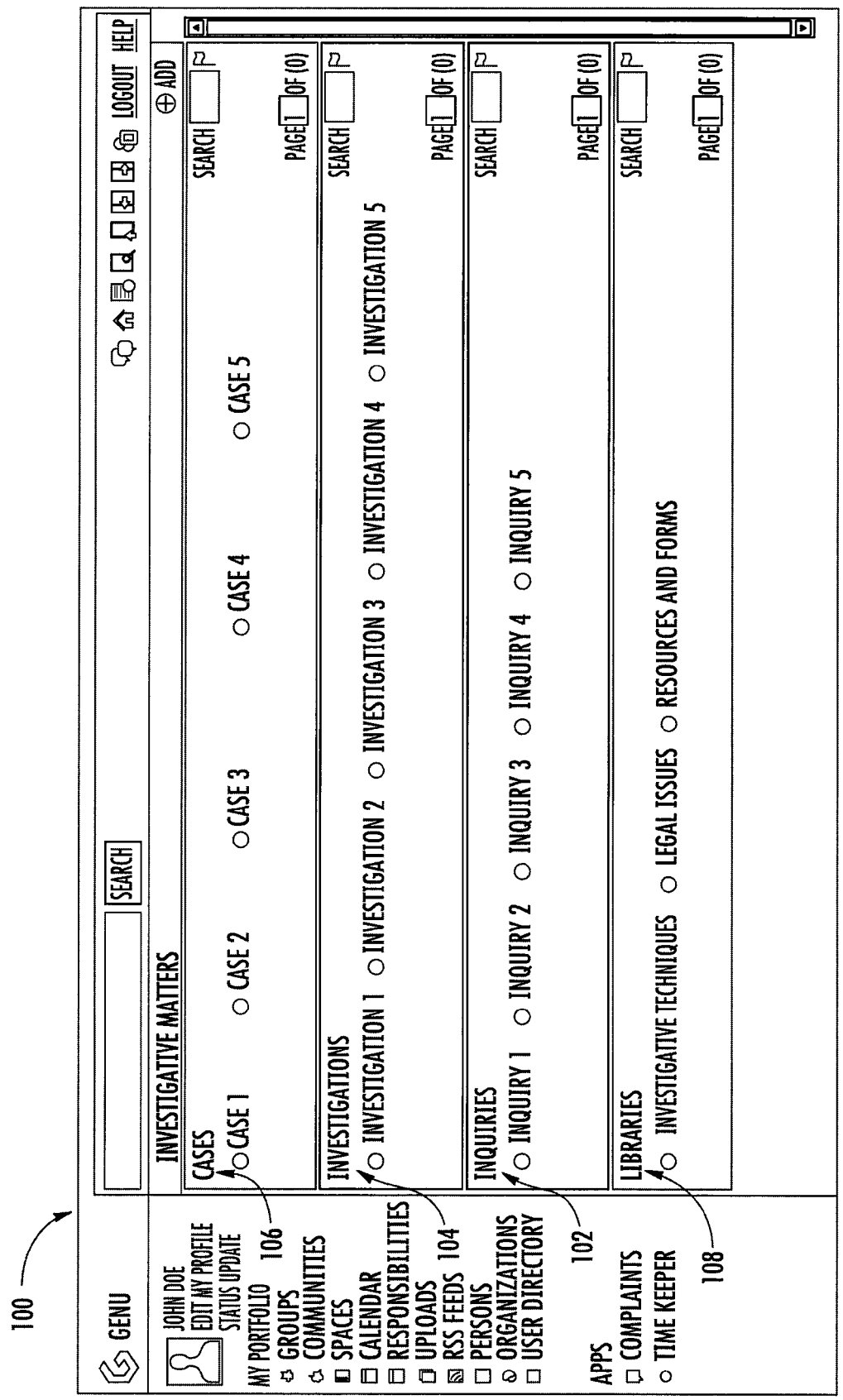
FIG. 4 illustrates a screenshot of a user interface showing investigative matters organized by type according to one example embodiment of the present disclosure.

In this regard, FIG. 4 illustrates an example screenshot of a home screen 100 that the user interface 72 may output. As illustrated, although the number of categories and the category descriptions can be configured locally, example categories of investigative matters may include inquiries 102, investigations 104, and cases 106. In this regard, an inquiry may be an initial review of the facts of an incident or other issue. An investigation may be a more detailed review of the issue, and a case may involve the pursuit or defense of a claim or charge relating to the issue. Accordingly, investigative matters may be promoted through the various categories in sequence if/when the investigative matters progress. Additionally, a library 108 may refer to a collection of information that may be related to one or more of the inquiries, investigative matters, and cases.

In some embodiments the apparatus 50 may provide for submission of information from outside parties interested in pursuing an investigative matter. In this regard, the resource module 78 and/or the communication interface 74 of the apparatus 50 may provide an initial contact interface through which an outside party may submit information regarding an investigative matter the outside party wishes to pursue. For example, a website may include an online form or email contact information that allows outside parties to contact the firm or other organization that employs the apparatus 50 to make a complaint, or to report some irregularity that might warrant pursuit of an investigative matter. Upon submission of the form or email, the information provided therein may be directly and automatically uploaded by the resource module 78 in some embodiments.

Thereby, an investigator, who may be automatically notified by email in some embodiments, may review the submission and determine whether an inquiry into the investigative matter is warranted. If the investigator determines that an inquiry is warranted, the submission may, on approval of a nominated person/role with the relevant permission as controlled by the permissions module 86, be converted by the apparatus into, and categorized as, an inquiry. Accordingly, the resource module 78 may associate the information provided by the outside party with the inquiry as source material related thereto. Further, if/when the inquiry progresses to an investigation and/or case, again on approval of a nominated person/role with the relevant permission as controlled by the permissions module 86, the resource module 78 may maintain the association of the source material(s) therewith.

Each investigative matter may include source materials associated therewith, as may be controlled by the resource module 78. Source materials may be embodied in a variety of forms, such as depositions, testimony, contracts, statements, references, materials, facts, data, in any media format (e.g., audio, video, text, etc.) which may relate to an investigative matter. The scope and quantity of source materials may become relatively large as an investigative matter progresses. Accordingly, keeping track of the source materials using traditional investigative techniques may become cumbersome. Thus, in order to avoid oversight or loss of source materials and to provide for subsequent ease of access, the resource module 78 may provide for input, storage, tagging, categorization, and review of the source materials. For example, the resource module 78 may provide an investigator with the option to upload and store the source materials and then describe the source materials and apply appropriate tags and/or categories for later recall or association.

Figure 5:
FIG. 5 illustrates a screenshot of a user interface showing an upload interface for uploading source materials according to an example embodiment of the present disclosure.

In this regard, FIG. 5 illustrates an example screenshot of an upload interface 200, which may be provided by the resource module 78 in conjunction with the user interface 72, for uploading source materials. For example, the upload interface 200 may include a source input 202, whereby a source material may be selected for upload. A description input 204 and a note input 206 may respectively allow an investigator to describe the source material and record any notes pertaining to the source material. A provided by input 208 may be used to record information regarding the person that provided the source material. An investigative matter input 210 may be employed to associate the source material with one or more investigative matters, for example by providing for selection of existing investigative matters in some embodiments. In this regard, merely storing the source materials using traditional investigative techniques may not be sufficient to ensure proper use thereof. Thus, by associating the source material with an investigative matter, it may be relatively easy for an investigator to review the relevant source materials. When the apparatus 50 is employed to conduct multiple investigative matters, the source materials may have relevance to more than one investigative matter and accordingly, the resource module 78 may provide for associating the source materials with one or more investigative matters. However, in another embodiment the investigative matter input 210 and the resource module 78 may allow for association of source materials with only one investigative matter, to avoid confusion with respect to which investigation the source materials are relevant. Further, descriptor type and code inputs 212, 214, which can be configured locally, may be employed to describe the source material (e.g., as a form, letter, transcript, testimony, etc.). Additionally, a date input 216 may record the date associated with the source material. These inputs 212, 214, 216 may further facilitate processing and use of the source materials.

Although the upload interface 200 is illustrated in FIG. 5 as providing for upload of individual source materials, in other embodiments the upload interface may provide for bulk upload of multiple source materials. In this regard, the upload interface may provide for selection of a plurality of source materials (e.g., by selecting a folder containing the source materials) stored in a computer of the user uploading the source materials or otherwise available thereto (e.g., in a network drive or in removable media). By way of further example, a user may drag and drop the source materials (or a folder thereof) into a bin associated with the system described herein into which the source materials are uploaded. Prior to upload into the bin, the source materials may be tagged with an identifier and associated with an investigation. Once the source materials are uploaded to the bin, the user may add descriptions, tags, dates of the source materials, and other information associated therewith on an individual or group basis, as may be appropriate. The documents may then be moved into folders associated with the investigation selected (e.g., initially into a folder containing unprocessed documents), as specified by the user.

Accordingly, the resource module 78 may store and associate the source materials with one or more investigative matters such that an investigator may have convenient access thereto. During the course of an investigative matter, one or more investigators with an appropriate role and/or permission may review each of the source materials to determine the relevance of the source materials to the investigative matter at hand. While reviewing the source materials, the investigators may note the presence of certain key facts, or develop certain conclusions, hypotheses, or produce other processed data relevant to the investigative matter referred to herein as knowledge elements. Additionally, investigators may review who processed each source material, when the source material was processed, and how many knowledge elements were derived therefrom. Knowledge elements may be produced during the course of a traditional investigative matter. However, traditional investigative techniques may fail to adequately capture and utilize knowledge elements.

In this regard, investigators employing traditional investigative techniques produce knowledge elements, but they may not be organized in a useable manner or in a manner that allows the knowledge elements to be easily accessed later in the investigative matter. For example, during the course of a traditional investigative matter, each investigator may personally record knowledge elements, but they may not be shared with other investigators or recorded using the same methodology. Further, even when the knowledge elements are shared with other investigators, it may be difficult to determine which knowledge elements are related, since each investigator may employ different terminology in describing the knowledge elements.

Accordingly, the apparatus 50 provided herein may include features configured to enhance the usability of knowledge elements. In this regard, FIG. 6 illustrates an example screenshot of an input interface 300, which may be provided by the knowledge module 80 in conjunction with the user interface 72, for inputting knowledge elements. The input interface 300 may include a knowledge element input 302 at which the knowledge element may be inputted. A source material input 304 may allow the user to select the source material from which the knowledge element is derived (e.g., by providing a list of the uploaded source materials) and link the knowledge element thereto such that the source material is accessible via the link.

In this regard, during a traditional investigative matter, it may be possible for an investigator to lose track of the basis for a knowledge element he or she develops. If an investigator is unable to cite the source material forming the basis of the knowledge element, the knowledge element may be of little value. Accordingly, the apparatus 50 may avoid issues with respect to losing track of the basis for a knowledge element by allowing an investigator to link the knowledge element to the source material(s) from which the knowledge element originated. Thus, the linking module 84 can provide for creation of a link associated with the knowledge element that allows the investigators to know the source material from which the knowledge element originates, and quickly access the source material. For example, if an investigator believes that he or she has determined that a suspect was not at the crime scene at the time of the crime (this may constitute a knowledge element) based on a security video from a location far away from the scene of the crime (the source material), the knowledge module 80 can provide for categorizing the knowledge element in the relevant issue category (e.g., the issue of an alibi) and the linking module 84 can provide for a link to the security video (source materials), such that the basis for the knowledge element is not lost.

Linking, as used herein, refers to employing hyperlinks, or other electronic implements to create a reference which may be employed to access a referenced item. For example, when a knowledge element is linked to a source material, clicking on (or otherwise following) the link in the knowledge element may direct the investigator to the source material (e.g., a document, webpage, etc.). Accordingly, the investigator may be provided with a convenient and rapid way to access the source material from which the knowledge element is derived.

Knowledge elements may also be created in other manners in some embodiments. For example, in one embodiment a user may be provided with a knowledge element creation tool that is accessible via a browser bar of an internet browser. When an investigator locates a webpage that includes relevant information, the investigator may employ the tool to capture information therefrom and create a new knowledge element. For example, an investigator may select a portion of text or other media in the webpage, and when the tool is activated (e.g., by selecting an appropriate button associated therewith displayed in a browser bar), the uniform resource locator ("URL"), headline or title of the webpage, the highlighted text, and/or other information may be automatically populated into a new knowledge element by the tool, which may be displayed in an organized format when the tool is activated. In some embodiments the tool may additionally save a copy of the webpage, which may be converted into another format such as a portable document format (PDF). Accordingly, an investigator may quickly and easily prepare new knowledge elements when browsing the internet in some embodiments. In some embodiments the tool may be installed into the browser bar by dragging and dropping the button associated with the tool into the browser bar. In this regard, in some embodiments the apparatuses, systems, and methods described herein may be accessible via, and displayed by, an internet browser. For example, the apparatuses, systems, and methods may be embodied as or run as a software as a service "SaaS," in which the software and associated data are centrally hosted on the cloud and it is accessed by users using a web browser.

As a part of creating the knowledge elements, in some embodiments, the apparatus 50 may provide for annotating the source material. For example, in one embodiment the resource module 78 may store a working copy of each piece of source material, while retaining an original copy of the source material, which may be employed as evidence or for other purposes. Thus, the investigator may highlight, mark-up, add or delete (e.g., redact) material, or otherwise annotate the working copy of the source material such that relevant portions thereof are quickly identifiable.

In some embodiments, the linking module 84 may provide for creation of a link to the source material that leads directly to one or more specific portions of the source material which the investigator identifies as relevant. For example, the link may lead to a portion of the text in a document, or a portion of an audio or video recording that is of particular importance and forms the basis of the knowledge element derived therefrom. The link may be then be included in a knowledge element or directly in the narrative itself to indicate the source of the conclusions included therein. Accordingly, after a knowledge element or narrative is created, the basis thereof in the source material may be quickly reviewed, for example, to ensure that the knowledge element or narrative created from it is correct, reasonable, and complete. In one embodiment a user may select a portion of the text in the source material, and then employ the linking module 84 to create a new knowledge element thereon. In this regard, the link, the knowledge (which may included the selected text), and the source material may be pre-populated in the knowledge element for the user's convenience.

Returning to the input interface 300, an importance input 306 may allow the user to describe why exactly the knowledge element is relevant to the investigative matter. A headline input 308 may allow the user to input a headline, which may be employed for a variety of uses such as briefly summarizing the knowledge element or as a reminder or prompt as to the circumstances under which the knowledge element was captured or created. Further, an investigative matter input 310 may provide for selection of one or more particular investigative matters to which the knowledge element pertains. Additionally, an issue category input 312 and a sub-issue category input 314 may allow the user to select the issue category and sub-issue categories in which the knowledge element should be categorized from a pre-defined list of issue/sub-issue categories, or the user may create user-defined issue/sub-issue categories in some embodiments, as illustrated at buttons 313*a, b*.

In this regard, the knowledge module 80 may provide for categorization of knowledge elements into one or more issue/sub-issue categories to thereby produce categorized knowledge elements associated with issues relevant to an investigative matter. The issues categories may be predefined at the start of an investigative matter. For example, the knowledge module 80 may include a list of issue categories that have been used in the past in certain types of cases or are known issues associated with particular types of investigative matters. By way of example, in a criminal defense case, one issue category to which the knowledge elements relate may be that of an alibi. By way of further example, in a civil case one issue category may be that of damages or in an investigative matter involving financial losses, the issue categories may include fraud and/or misrepresentations. The list of predefined issues/sub-issues may be initially inputted at the start of an investigation. For example, a user having appropriate permissions may define the list of issues and sub-issues.

Alternatively or additionally to having predefined issue categories to select from, in some embodiments the knowledge module 80 may provide for the creation of user-defined issue/sub-issue categories. For example, if an investigator determines that his contribution of a knowledge element does not fit into any of the predefined issue categories, he or she may create a new issue category and/or a new sub-issue category, for example by selecting buttons 313a, b. Accordingly, the issue categories may be adapted to the particular circumstances of an investigative matter as it develops. However, in other embodiments the knowledge module 80 may not allow for creation of user-defined issue/sub-issue categories in order to force the users to employ the suggested categories and thereby limit the number of categories such that concerns with respect to investigators employing differing terminology to describe the categories may be avoided.

Figure 7:
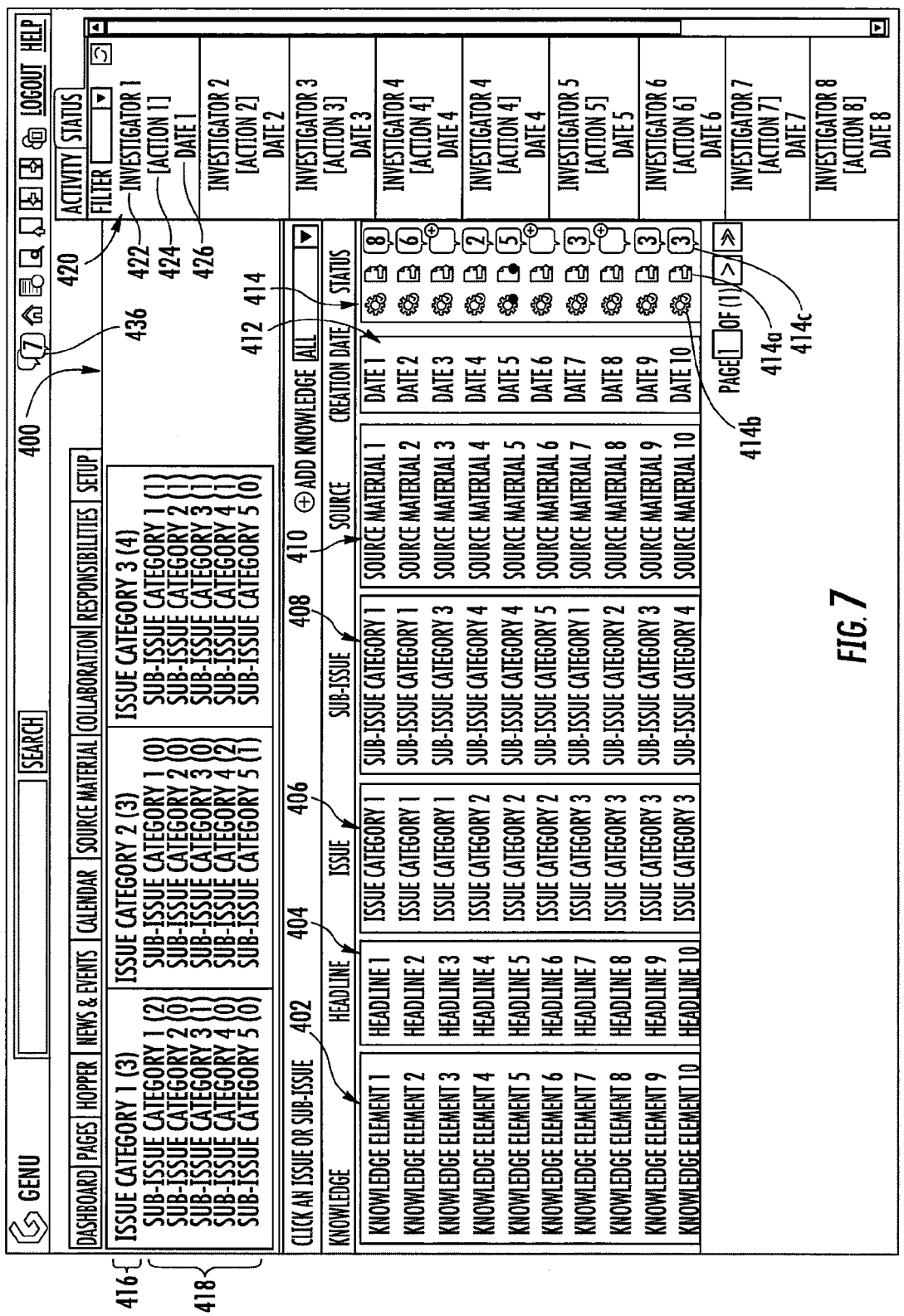
FIG. 7 illustrates a screenshot of a user interface showing a hopper and a plurality of categorized knowledge elements included therein according to an example embodiment of the present disclosure.

After knowledge elements are inputted, they may be organized in, and accessed through, a "hopper." An example hopper 400 that the user interface 72 may output when the user interface 72 is embodied as a display is illustrated in FIG. 7. As illustrated, the hopper 400 may include one or more knowledge elements 402. As previously described, each knowledge element 402 may include various pieces of information associated therewith. For example, each knowledge element 402 may include a headline 404, an issue category 406, and a sub-issue category 408 associated therewith. Further, a source material 410 may be listed for each knowledge element. In some embodiments the linking module 84 may link the knowledge element 402 to the source material 410 such that a user may click on the link for the source material to access a copy thereof. Additionally, a date of creation 412 and one or more status indicators 414 may be listed for each knowledge element 402, as will be described below.

After the knowledge elements 402 are categorized, an investigator may view all of the knowledge elements, by categorized issue or sub-issue in the hopper 400. However, the knowledge module 80 may also provide for selection of an issue category 406 or sub-issue category 408 as respectively illustrated at buttons 416 and 418. Thereby, the categorized knowledge elements included in a selected one of the issue categories 406 or sub-issue categories 408 may be displayed. Further, as illustrated, in some embodiments the knowledge module 80 may display the number of knowledge elements 402 included in each issue category 406 or sub-issue category 408 to determine the present status of the knowledge elements associated with each issue/sub-issue category. Accordingly, the apparatus 50 may be employed to develop knowledge elements from source materials and categorize the knowledge elements into issue/sub-issue categories, to provide easy access thereto for the investigators.

In some embodiments of the apparatus 50 whenever an action occurs within an investigative matter, this may be reflected in an activity log 420, which may be provided in conjunction with various other features, such as beside the above-described hopper 400, as illustrated in FIG. 7. The activity log 420 may include information such as the name of an investigator 422, the action 424 conducted thereby, and the date 426 of the action. When the user is viewing the activity log outside of a particular investigation, the activity log may display the name of the investigation each activity took place in, whereas when a user is viewing the activity log associated with a particular investigation, the name of the investigation may be left out. For example, when a new knowledge element 402 is created, a new source material 410 is uploaded, or a narrative is edited, this may be reflected in the activity log 420. Accordingly, each investigator may be apprised of the recent activities associated with the investigative matter. The investigators may then comment on the actions 424 listed in the activity log, if desired, as described below.

Figure 8:
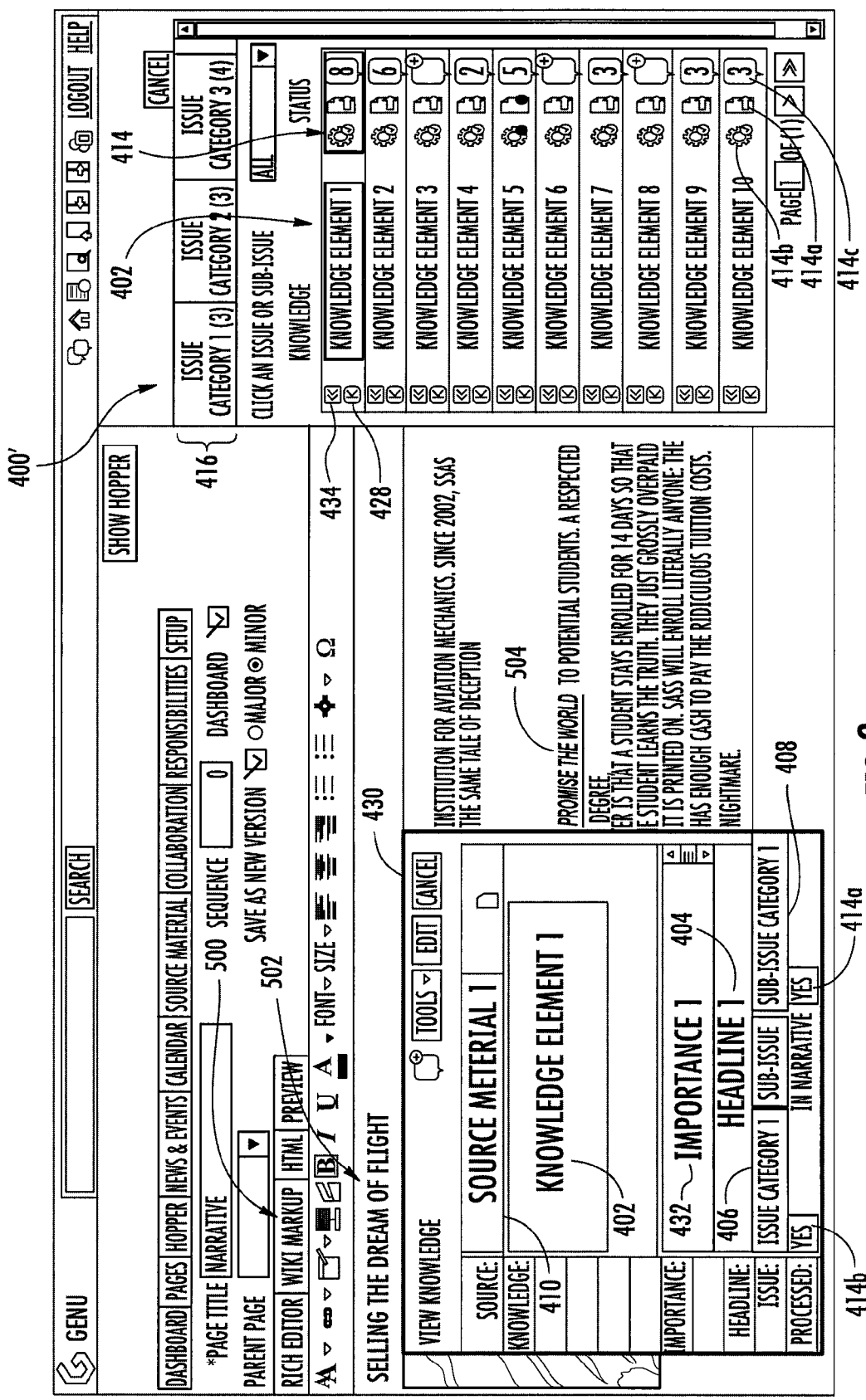
FIG. 8 illustrates a screenshot of a user interface showing an editor which may be provided for preparation of a narrative according to an example embodiment of the present disclosure.

As illustrated in FIG. 8, the apparatus 50 may also include an editor 500, which may be provided by the narrative module 82. The editor 500 may provide for preparation of a narrative 502. In some embodiments the editor 500 may be configured to allow for inclusion of text, audio, video, and/or other data in the narrative 502. Further, in order to facilitate the production of the narrative 502, the apparatus may provide for collaborative preparation of the narrative. Thus, multiple investigators with an appropriate role and/or permission may upload source materials, review the source materials, produce knowledge elements, categorize the knowledge elements into issue categories and sub-categories, share and collaborate with respect to the knowledge elements and/or source materials for example, to confirm, contradict or question the categorized knowledge elements and/or source materials, and prepare a narrative based at least in part on the knowledge elements and/or the source materials.

As noted above, it may be important to maintain a connection between the source materials and the knowledge elements derived therefrom. It may also be desirable to maintain a connection between the source materials and the narrative for the same reason; namely, to ensure that the source materials support the conclusions drawn therefrom and embodied in the relevant text in the narrative. Accordingly, in some embodiments the linking module 84 of the apparatus 50 may be configured to provide for linking portions of the narrative 502 to at least one of the knowledge elements and the source materials.

By way of example, the apparatus 50 may allow for, request, or require investigators preparing the narrative 502 to link portions of the narrative to one or both of the source materials and the knowledge elements. For example, the apparatus 50 may request or require entry of a source material and/or knowledge element after the completion of each sentence or paragraph. In some embodiments the apparatus 50 may suggest links to source materials and/or knowledge elements based on similarities between text entered in the narrative and text included in the source materials and/or knowledge elements.

Accordingly, portions of the narrative 502 may include links 504 (e.g., hyperlinks or other forms of links) that direct the investigators back to the knowledge elements (or directly to the source materials) on which the narrative is based. As noted above, the knowledge elements may in-turn include links that direct the investigator back to the source materials upon which the knowledge elements are based. Accordingly, the apparatus 50 disclosed herein may encourage accountability and basis in fact on the part of the investigators by requiring, requesting, or allowing investigators to link the narrative back to the source materials directly and/or indirectly through the knowledge elements. Thus, the narrative ultimately produced from the source materials may have a solid basis in the facts included therein.

In addition to improving the quality of the narrative 502, the apparatus 50 disclosed herein may also be configured to facilitate production of the narrative in other manners. In this regard, as noted above, the knowledge module 80 may provide for categorization of knowledge elements into one or more issue categories to produce categorized knowledge elements. In order to allow for simplified access to the knowledge elements, in some embodiments an embodiment of the hopper 400' may be displayed in addition to the editor 500 for the narrative 502 (i.e. at the same time the editor is displayed).

As illustrated in FIG. 8, the hopper 400', which may be positioned adjacent to the editor 500 for the narrative 502, may include some or all of the information included in the embodiment of the hopper 400 previously described and illustrated in FIG. 7. Accordingly, an investigator may be able to quickly review the categorized knowledge elements 402 to determine where and how to use the knowledge element in the narrative 502. For example, while drafting the narrative 502, an investigator may select a button 416 in the hopper 400' corresponding to a particular issue category 406 to access the knowledge elements 402 categorized therein. In one embodiment, the sub-issue categories 408 associated with the issue categories 406 may be accessed by selecting buttons 418 associated therewith (see, e.g., FIG. 7), such that an investigator may view the categorized knowledge elements 402 included in a selected sub-issue category.

Further, in some embodiments the apparatus 50 may provide for display of various other details with respect to a knowledge element 402 upon selection of a details button 428. For example, a box 430 may be displayed upon selection of the details button 428. The box 430 may include various other pieces of information associated with the knowledge element 402 corresponding to the details button 428, including a link to the source material 410, an importance 432 of the knowledge element, the headline 404 for the knowledge element, the issue and sub-issue categories 406, 408 for the knowledge element, and one or more indicators 414, as will be discussed below. Accordingly, an investigator may have all of the knowledge elements derived from the source materials and related to the narrative they are drafting (and links to the source materials themselves) conveniently available within a single view, such that the investigator may more rapidly draft and/or edit the narrative.

Thus, when preparing the narrative 502, the investigators may employ the hopper 400' to quickly access the knowledge elements 402 included within selected issue and sub-issue categories 406, 408. Therefore, drafting the narrative 502 may be relatively easily accomplished by including text drawn from the knowledge elements 402 from each of the relevant issue and sub-issue categories 406, 408 in the narrative. Note that the hopper 400' may also provide links to the source materials in some embodiments.

Further, in some embodiments incorporation of the text of the knowledge elements 402 may be simplified by an incorporation button 434. In this regard, selection of the incorporation button 434 may insert the text of the knowledge element 402 associated with the selected incorporation button into the narrative 502 (e.g., at the present position of the cursor in the narrative). Further, in some embodiments the linking module 84 may enable an investigator to link the inserted text to the knowledge element 402 or source materials corresponding thereto (e.g., by hyperlinking the inserted text thereto). A link to a corresponding source material and/or knowledge element may also be inserted by selecting text within the narrative and clicking a button to link the selected text to one or both of the source material and the knowledge element.

Once a portion of the narrative 502 is linked to a knowledge element 402, an investigator may select the link (e.g., link 504) and the apparatus 50 may output (e.g., display or provide for display of) the knowledge element associated therewith. For example, the box 430 which is displayed when the details button 428 is selected may also be displayed upon selection of a link in the narrative 502 corresponding to that particular knowledge element 402. However, various other pieces of information associated with the knowledge element 402 may be additionally or alternatively displayed, such as the author of the knowledge element and the date of creation.

In order to keep track of what information is included in the narrative 502, the apparatus 50 may further provide for indicating whether the knowledge elements 402 have been used in the narrative. In this regard, the status indicators 414 mentioned above may include a usage indicator 414a. The usage indicator 414a may provide for indicating whether the knowledge element 402 associated therewith is referenced in the narrative 502. As illustrated, in one embodiment the usage indicator 414a may comprise an arrow that may be displayed beside a knowledge element 402 that is included in the narrative, whereas no icon or a different icon or indicator (e.g., an x-mark) may be associated with those knowledge elements that have not been included in the narrative 502. In some embodiments the knowledge module 80 may automatically indicate whether a knowledge element 402 is included in the narrative 502 or not. For example, when the narrative 502 includes a link to a knowledge element 402, the apparatus 50 may automatically associate a usage indicator 414a with the referenced knowledge element that notes that it has been used in the narrative. In another embodiment, an investigator may manual employ the usage indicator 414a to indicate usage of the knowledge element 402 (e.g., by clicking on the usage indicator). In an intermediate embodiment, the apparatus 50 may automatically employ the usage indicator 414a to indicate that a knowledge element is used in the narrative, but then the apparatus may require a user to manually click on the usage indicator to indicate that the link is removed.

Further, in some embodiments, although not illustrated, a separate indicator may be employed to indicate whether a source material is referenced in the narrative. For example, when the narrative includes a link to a source material, the apparatus may automatically associate an indicator with the referenced source material that notes that it has been used in the narrative. By way of further example, in some embodiments the apparatus may also automatically display an indicator noting that a source material is referenced in the narrative when a knowledge element based on the source material is included in the narrative. In another embodiment, an investigator may manually employ an indicator to indicate usage of a source material (e.g., by clicking on the indicator).

Also, in some embodiments the apparatus may graphically display use of the source materials and/or knowledge elements in the narrative. For example, the apparatus may create a pie chart or bar graph or other output which illustrates the number of knowledge elements employed from each of the relevant issue/sub-issue categories, or the number of references to each of the source materials and/or knowledge elements in the narrative. The percentage of use of knowledge element in each issue/sub-issue category may also be displayed. Accordingly, the apparatus may provide the investigators with a convenient way to quickly determine which source materials and/or knowledge elements have been included in the narrative and to what extent. Thus, investigators may more easily avoid overlooking important source materials and/or knowledge elements in the narrative and quickly determine what issues have support in a narrative and which issues do not.

The status indicators 414 may also include a processed indicator 414b, which may be employed to indicate whether the knowledge elements 402 have been processed. For example, the knowledge elements may be confirmed (i.e., confirmed as correct) or questioned (i.e., the validity of the knowledge element may be suspect or not yet confirmed as correct). In this regard, it may be desirable for investigators to review the knowledge elements produced by other investigators to ensure that the information included therein is correct. Thus, the work completed by the investigators may be collaboratively reviewed. For example, if an investigator reviews a knowledge element and comes to the conclusion that the knowledge element may be incorrect or that the knowledge element may not be supported by the source material, the knowledge module 80 may provide for questioning of it by employing the processed indicator 414b to indicate that the knowledge element is suspect. Conversely, if the investigator believes that the knowledge element is correct and supported by the source material, the apparatus may provide for confirmation of it by employing the processed indicator 414b to indicate such. In one embodiment, as illustrated, the processed indicator 414b may display a check mark for processed knowledge elements 402 and an x-mark for questioned (e.g., unprocessed or suspect) knowledge elements. However, various other types and forms of indicators may be employed to indicate the confirmation status of knowledge elements in other embodiments.

The status indicators 414 may further comprise a comment indicator 414c. The comment indicator may indicate whether investigators have commented on a respective knowledge element 402. When comments have been created, the comment indicator 414c may indicate the number of comments associated with the knowledge element 402. Clicking on the comment indicator 414c may direct an investigator to any comments associated with the knowledge element 402 and allow the investigator to add a new comment, if desired.

As described above, comments may be associated with knowledge elements and actions listed in the activity log. Theses comments may be provided to other users depending on whether they are associated with the particular investigation the comments relate to, the user roles, user permissions, etc. Users may provide comments directly other user in some embodiments, which may only be visible to the investigator(s) particularly selected for the comments. In one embodiment an investigator may be able to view each of the comments directed to him or her or a group to which the investigator belongs (e.g., members of an investigative team associated with a particular investigation). The user may then be able to sort the comments based on whether they are directed to him or her individually or the groups as a whole. In addition, in order to help keep an investigator apprised of comments directed to him or her or groups in which the investigator is included, an overall indicator 436 (see FIG. 7) may display the number of discussions that individual has been involved in but not yet opened as well as news and events updates that apply to the investigator, which the user has not yet viewed. For example, the number of unopened discussions may be displayed in red to bring the investigator's attention thereto. The usage of comments may thus improve collaboration between the various investigators. The communication interface 74 may allow for sharing of comments, as discussed herein.

Further, in some embodiments the permissions module 86 may be employed to control the ability of users to perform certain functions (e.g., various ones of the above-described functions). For example, the permissions module 86 may provide for creating one or more permissions such that only certain investigators may have permission to create, read, update or delete knowledge elements, narratives, or source materials or perform other functions. In some embodiments the permissions may be selectively applied within a specific investigative matter, and/or within particular sections within an investigative matter. By way of further example, when the apparatus 50 is employed in a law firm environment, associates may have permission to create a knowledge element, but only partners may have the authority to edit, delete, or confirm the knowledge element. Thereby, partners may be able to control modification and/or deletion of knowledge elements to ensure that they are not inappropriately modified, deleted, or confirmed. However, in other embodiments all investigators may have the authority to create, read, update or delete knowledge elements or source materials, or differing permission schemes may be determined and applied. As noted above, the permission schemes may be applied to different investigative matters and to particular sections within an investigative matter in some embodiments. In addition, in some embodiments outside persons (e.g., external to the law firm in the example provided above) may be invited to use the apparatus 50, for example in a class action lawsuit which are external to the law firm performing the majority of the work in performing the narrative, and their permissions to create, read, update or delete knowledge elements or source materials and perform related functions can also be configured such that the external parties have appropriate permissions. Accordingly, the permissions module 86 may be configured to provide for selection of a permission level for each of the functions disclosed herein. The permissions may be set individually (i.e. for each user), or the permissions may be set by particular role or group within the organization employing the apparatus. Further, the permissions may be set based on whether the users of the apparatus 50 are internal to the organization (e.g., employees) or external to the organization (e.g., outside parties).

Also, as noted above, the apparatus 50 may provide for configuration of permissions given to investigators (and/or other users employing the apparatus), which may restrict the abilities of the investigators to perform various functions therein (e.g., to create, read, update, or delete). In this regard, depending on a user's role (which may have default permissions, and which may be specified by the organization employing the apparatus 50), permissions may also be investigative matter specific. For example, an investigator may only be granted access to particular source materials associated with an investigative matter an investigator is working on. By way of further example, a user may be a supervising attorney on one investigative matter (a role with a large number of permissions), and a working attorney on another investigative matter (a role with fewer permissions). Further, certain users may be granted permission to invite external users to participate in an investigative matter, with the access provided and restricted as desired. For example, outside counsel collaborating on a class action lawsuit may only be able to access data associated with that particular investigative matter, or a part of it deemed relevant to them. Accordingly, the permissions module 86 may provide for configuration of the permissions as may be desirable for each particular investigative matter and/or each particular user, role, or group. The apparatus 50 may include a variety of additional features that further enhance creation of the narrative and assist investigators in performing related tasks. For example, the apparatus 50 may be configured to record and associate time spent by an investigator working on a particular investigative matter with that particular investigative matter. Accordingly, for example, billing associated with the investigative matter may be simplified and/or supervisors may be made aware of the time spent on each investigative matter. In this regard, in some embodiments the apparatus 50 may be configured to automatically associate time spent within a particular investigative matter with that particular investigative matter.

The apparatus 50 may also record a log of the contributions by each of the investigators. Accordingly, the apparatus 50 may provide supervisors with a way to determine not only the time spent on each investigative matter by each investigator, but also the contributions resulting therefrom. In one example embodiment, a log of activity may be displayed, which allows the investigators to quickly determine the changes which have occurred in the investigative matter, and by whom, such as input of new source materials and knowledge elements, as well as updates to narratives.

Further, since investigative matters may involve a number of parties, which may speak various languages and/or the source materials may be written in differing languages, the apparatus 50 may be configured to automatically translate the text displayed in frames of the application and labels based on the preferences of each user. Thus, for example, when an investigator is a native Spanish speaker, and the investigator specifies Spanish as his preferred language, he or she will be able to choose to view text in Spanish.

Additionally, the apparatus 50 may provide for searching the internal materials, including searching for and/or within documents (e.g., source materials), knowledge elements, and/or narrative(s) in parallel with searching an external source. For example, FIG. 9 illustrates an example search page 600. As illustrated, a single search query 602 may provide internal search results 604 (e.g., source materials, etc.) in addition to external search results 606 (e.g., items found on the internet), and the results may be provided in side-by-side columns. An advanced search function may also be included that allows a user to specify what terms must be included in the search results, must be excluded from the search results, and/or the search function may search for any of the search terms included in list by a user. Clicking on one of the search results 604, 606 may take the user to a page displaying the particular item selected. Searches may also be conducted for persons, organizations, complaints, news and events, comments, and other items and information. Thus, searches may be restricted to these particular categories, when appropriate. Accordingly, investigators may be provided with internal and external search results in a convenient format without having to exit the application. Further, the investigators may alternatively search only internal materials using an internal search query 608 or only external materials using an external search query 610. The internal search query 608 may also provide the investigators with the option to only search within materials associated with specified investigative matters in some embodiments.

Further, the apparatus 50 may provide for the above-described internal and/or external searching during the knowledge element creation process in some embodiments. For example, as illustrated in FIG. 6, a button 316 may be employed by a user to access the internal and/or external search results, as described above. In one embodiment selecting the button 316 may automatically search based on information populated in the knowledge element input 302 and/or other portions of the knowledge element input interface 300. For example, when a user inputs text in the knowledge element input 302, and then selects the button 316, search results relating to the text in the knowledge element input may be displayed. Alternatively, the user may manually input search terms. Regardless, by allowing the investigator to search internal and/or external results at the time of creating a knowledge element, the user may be provided with additional information, as recommended by the apparatus, which may be relevant to the knowledge element.

In an additional embodiment, a search function may be provided by a recommender tool that is accessible via a browser bar of an internet browser. In this regard, when an investigator locates a webpage that includes relevant information the investigator may select text on the webpage. When the tool is activated (e.g., by selecting an appropriate button associated therewith displayed in the browser bar), the recommender tool may provide the user with search results (e.g., internal search results and/or external search results, as described above) in the window the user is presently viewing or in a new window. Accordingly, an investigator may quickly and easily search for information when browsing the internet in some embodiments. In some embodiments the recommender tool may be installed into the browser bar by dragging and dropping the button associated with the tool into the browser bar. In this regard, in some embodiments the system described herein may be accessible via, and displayed by, an internet browser.

Note that the figures included herewith illustrate example embodiments of screens that may be outputted by the apparatus 50. However, it should be understood that the figures are provided for example purposes. In this regard, the apparatus 50 may be configured to employ the user interface 72 to output various other configurations in other embodiments.

In terms of methods associated with embodiments of the present disclosure, the above-described apparatus 50 or other apparatuses may be employed.

The method may begin with gathering and uploading the source materials. Knowledge elements may then be created, based on tangible source materials and/or based on intangible source materials such as unrecorded conversations or observations. For example, the above-described knowledge element creation tool may be employed to create knowledge elements, and/or knowledge elements may be created through other methods such as by reviewing source materials. During the creation of the knowledge elements, the knowledge element may be associated with the source material, the knowledge may be captured in written form, its significance may be described, and the knowledge element may be associated with an issue or sub-issue. The knowledge element may then be placed in the hopper where it is held for later use. Other investigators may be notified of the knowledge element's creation, and the other investigators may collaborate to confirm or question the knowledge element and/or the source material. The knowledge elements may be incorporated into a narrative relating to the investigative matter, with links included therein that reference the knowledge elements and/or source materials on which the narrative is based. Status icons may indicate whether the knowledge elements have been confirmed or questioned and indicated whether the knowledge elements have been referenced in the narrative. Thereby, other investigators may employ the hyperlinks to assess the validity of the statements in the narrative and redirect the investigative matter as may be appropriate.

FIG. 10 expands on and describes this method with more specificity. In this regard, FIG. 10 is a flowchart of a system, method and program product according to an example embodiment. Each block of the flowchart, and combinations of blocks in the flowchart, may be implemented by various means, such as hardware, firmware, processor, circuitry and/or other devices associated with execution of software including one or more computer program instructions. These devices may be specially configured to perform the specified functions. Further, these computer program instructions may be stored in a computer-readable memory which, when executed, implement the functions specified in the flowchart block(s).

In this regard, one embodiment of a method for conducting an investigative matter may include providing for categorization of a knowledge element derived from a source material into one or more issue categories to produce a categorized knowledge element at operation 700. Further, the method may include providing for preparation of a narrative based at least in part on the categorized knowledge element at operation 702. Providing for preparation of the narrative at operation 702 may comprise providing for collaborative preparation of the narrative in some embodiments. The method may additionally include providing for linking a portion of the narrative to the knowledge element and/or source material the portion is based upon at operation 704. The method may also include outputting (e.g., displaying or providing for display of) the knowledge element and/or knowledge element upon selection of the portion of the narrative that is linked thereto at operation 706.

In some embodiments, certain ones of the above-described operations (as illustrated in solid lines in FIG. 10) may be modified or added onto. In some embodiments additional operations may also be included (some examples of which are shown in dashed lines in FIG. 10). It should be appreciated that each of the modifications and/or optional additions may be included with the above-described operations (700-706) either alone or in combination with any other operations described herein.

For example, the method may further include providing for selection of the issue categories from a predefined list at operation 708, which may be based on a type of the investigative matter in some embodiments. The method may also include providing for creation of a user-defined category for the knowledge element in some embodiments. Additionally, the method may include providing for linking the knowledge element to the source material at operation 710, which may occur prior to categorizing the knowledge elements at operation 700 in some embodiments. The method may also include providing for upload of the source material and providing for associating the source material with the investigative matter in some embodiments. Further, the method may include providing for searching the source material, the knowledge element, and the narrative in parallel with searching an external source in some embodiments.

The method may also include providing for confirmation and questioning of the knowledge element at operation 712. Further, the method may include providing for selection of the issue categories at operation 714, which may be conducted during the narrative drafting process. The method may additionally include outputting (e.g., displaying or providing for display of) the categorized knowledge element included in a selected one of the issue categories at operation 716 such that the investigator drafting the narrative may see the knowledge elements included therein. Further, the method may include providing for indicating whether the knowledge element is referenced in the narrative at operation 718. As a result of employing some or all of the above-described operations, a persuasive narrative may be produced, which may be carefully based on information contained in the source materials.

In an example embodiment, an apparatus for performing the method of FIG. 10 and other methods described above may comprise a processor (for example, the processor 70) configured to perform some or each of the operations (700-718) described above. The processor may, for example, be configured to perform the operations (700-718). Alternatively, the apparatus may comprise means for performing each of the operations described above. In this regard, according to an example embodiment, examples of means for performing operations 700-718 may comprise, for example, the processor 70, the user interface 72, the communication interface 74, the resource module 78, the knowledge module 80, the narrative module 82, the linking module 84, and the permissions module 86, as described above.

In some embodiments the operation 700 of providing for categorization of a knowledge element derived from a source material into one or more issue categories to produce a categorized knowledge element may be conducted by means, such as the resource module 78, the knowledge module 80, and/or the processor 70. Additionally, the operation 702 of providing for preparation of a narrative based at least in part on the categorized knowledge element may be conducted by means, such as the resource module 78, the knowledge module 80, the narrative module 82, and/or the processor 70. Also, the operation 704 of providing for linking a portion of the narrative to the knowledge element the portion is based upon may be conducted by means, such as the resource module 78, knowledge module 80, the narrative module 82, the linking module 84, and/or the processor 70. Additionally, the operation 706 of outputting the knowledge element upon selection of the portion of the narrative that is linked thereto may be conducted by means, such as user interface 72, the knowledge module 80, the narrative module 82, the linking module 84, and/or the processor 70.

Further, providing for selection of the issue categories from a predefined list at operation 708 may be conducted by means, such as resource module 78, the knowledge module 80, and/or the processor 70. Additionally, the operation 710 of providing for linking the knowledge element to the source material may be conducted by means, such as the resource module 78, the knowledge module 80, the linking module 84, and/or the processor 70. Additionally, the operation 712 of providing for selection of the issue categories may be conducted by means, such as knowledge module 80, and/or the processor 70.

Also, the operation 714 of outputting the categorized knowledge element included in a selected one of the issue categories may be conducted by means, such as user interface 72, the knowledge module 80, and/or the processor 70. Further, the operation 716 of providing for indicating whether the knowledge element is referenced in the narrative may be conducted by means, such as the knowledge module 80, the narrative module 82, the linking module 84, and/or the processor 70. Additionally, the operation 718 of providing for confirmation and questioning of the knowledge element may be conducted by means, such as knowledge module 80, the permissions module 86, and/or the processor 70.

As noted, above, narratives may be collaboratively created in accordance with the described embodiments. Collaboration may be enabled by the communication interface 74 and network 30 in some embodiments. Each of the various operations and actions described above may be spread across various investigators in some embodiments. Accordingly, the investigators may collaborate on each of the respective functions described herein to ensure the accuracy and completeness of the investigation in a real-time manner. For example, conformation or questioning of knowledge elements may represent a collaborative effort. Further, a chat or comment function may allow investigators to communicate with one another during the investigative process. Alternatively or additionally, investigators may employ the systems, methods, and apparatuses employed herein to comment on investigator actions, source materials, knowledge elements, the narrative, news and events, directly to each other, and/or in other manners. Accordingly, narratives may be produced more accurately and more quickly.

Additionally, in one embodiment existing narratives and source materials may be collectively imported into the system. For example, if investigators have been employing an alternative system to draft narratives, the system described herein may allow each of these items to be imported therein as a group, with each item tagged or otherwise associated with an investigative matter. Accordingly, existing investigations may be imported with relative ease.

Further, it should be noted that each of the operations described herein may be subjected to permission requirements. In this regard, the permissions module 86 may be involved in each of the operations described above. By requiring permissions to complete some or all of the functions provided herein, the abilities of each of investigator to perform the functions may be particularly controlled, as desired. Thereby, for example, each investigator may be provided with a specified role, having specified permissions, in order to carry out the investigative process in an orderly manner with one or more differing levels of permissions allowing for managerial roles to supervise the process.

Many modifications and other aspects of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific aspects disclosed and that modifications and other aspects are intended to be included within the scope of the appended claims. Although specific terms are employed herein, they are used in a generic and descriptive sense only and not for purposes of limitation.

That which is claimed:

1. A method for conducting one or more investigative matters, the method comprising:
    providing for categorization of a plurality of knowledge elements into a plurality of issue categories to produce a plurality of categorized knowledge elements, the knowledge elements each comprising a text drafted by one or more users and derived by the one or more users from one or more source materials;
    providing for association of the one or more source materials and the knowledge elements with one of the investigative matters;
    providing an editor configured for drafting of an editable narrative by the one or more users relating to the one of the investigative matters based at least in part on the categorized knowledge elements;
    providing access to the categorized knowledge elements associated with the one of the investigative matters during drafting of the editable narrative by the one or more users via a hopper in which the knowledge elements are organized by the issue categories, the hopper being positioned adjacent the editor such that the knowledge elements are simultaneously viewable with the editor and the editable narrative included therein;
    providing for confirmation and questioning of the knowledge elements;
    providing for selection of a plurality of incorporation buttons within the hopper, each of the incorporation buttons being respectively associated with one of the knowledge elements, each of the incorporation buttons being configured to insert the text of the one of the knowledge elements associated therewith into the editable narrative;
    providing for adding a link to a portion of the editable narrative drafted by the one or more users, the link linking to one or more of the knowledge elements the portion is based upon; and
    outputting the one or more knowledge elements upon selection of the portion of the editable narrative that is linked thereto via a processor.

2. The method of claim 1, further comprising providing for selection of the issue categories from a predefined list.

3. The method of claim 1, further comprising providing for linking the knowledge elements to the one or more source materials.

4. The method of claim 1, further comprising providing for indicating whether the knowledge elements are referenced in the editable narrative.

5. The method of claim 1, wherein providing access to the categorized knowledge elements comprises providing for selection of the issue categories; and
    outputting the categorized knowledge elements included in a selected one of the issue categories.

6. The method of claim 1,
    wherein the investigative matters are selected from a group consisting of one or more legal investigative matters, one or more corporate investigative matters, one or more academic investigative matters, one or more journalistic investigative matters, one or more forensic accounting investigative matters, and one or more auditing investigative matters, and
    wherein the knowledge elements are selected from a group consisting of one or more facts, one or more conclusions, one or more hypotheses, one or more personal thoughts, one or more theories, and one or more conclusions.

7. An apparatus comprising at least one processor and at least one memory including computer program code, the at least one memory and the computer program code configured to, with the processor, cause the apparatus to:
    provide for categorization of a plurality of knowledge elements into a plurality of issue categories to produce a plurality of categorized knowledge elements, the knowledge elements each comprising a text drafted by one or more users and derived by the one or more users from one or more source materials;
    provide for association of the one or more source materials and the knowledge elements with one of one or more investigative matters;
    provide an editor configured for drafting of an editable narrative by the one or more users relating to the one of the investigative matters based at least in part on the categorized knowledge elements;
    provide access to the categorized knowledge elements associated with the one of the investigative matters during drafting of the editable narrative by the one or more users via a hopper in which the knowledge elements are organized by the issue categories, the hopper being positioned adjacent the editor such that the knowledge elements are simultaneously viewable with the editor and the editable narrative included therein;
    provide for confirmation and questioning of the knowledge elements;

provide for selection of a plurality of incorporation buttons within the hopper, each of the incorporation buttons being respectively associated with one of the knowledge elements, each of the incorporation buttons being configured to insert the text of the one of the knowledge elements associated therewith into the editable narrative;

provide for adding a link to a portion of the editable narrative drafted by the one or more users, the link linking to one or more of the knowledge elements the portion is based upon; and output the one or more knowledge elements upon selection of the portion of the editable narrative that is linked thereto.

8. The apparatus of claim 7, further configured to provide for selection of the issue categories from a predefined list.

9. The apparatus of claim 7, further configured to provide for linking the knowledge elements to the one or more source materials.

10. The apparatus of claim 7, further configured to provide for indicating whether the knowledge elements are referenced in the editable narrative.

11. The apparatus of claim 7, configured to provide access to the categorized knowledge elements by providing for selection of the issue categories; and
outputting the categorized knowledge elements included in a selected one of the issue categories.

12. The apparatus of claim 7,
wherein the investigative matters are selected from a group consisting of one or more legal investigative matters, one or more corporate investigative matters, one or more academic investigative matters, one or more journalistic investigative matters, one or more forensic accounting investigative matters, and one or more auditing investigative matters, and
wherein the knowledge elements are selected from a group consisting of one or more facts, one or more conclusions, one or more hypotheses, one or more personal thoughts, one or more theories, and one or more conclusions.

13. A computer program product comprising at least one non-transitory computer-readable storage medium having computer-executable program code portions stored therein, the computer-executable program code portions comprising:
program code instructions providing for categorization of a plurality of knowledge elements into a plurality of issue categories to produce a plurality of categorized knowledge elements, the knowledge elements each comprising a text drafted by one or more users and derived by the one or more users from one or more source materials;
program code instructions providing for association of the one or more source materials and the knowledge elements with one of one or more investigative matters;
program code instructions providing an editor configured for drafting of an editable narrative by the one or more users relating to the one of the investigative matters based at least in part on the categorized knowledge elements;
program code instructions providing access to the categorized knowledge elements associated with the one of the investigative matters during drafting of the editable narrative by the one or more users via a hopper in which the knowledge elements are organized by the issue categories, the hopper being positioned adjacent the editor such that the knowledge elements are simultaneously viewable with the editor and the editable narrative included therein;
program code instructions providing for confirmation and questioning of the knowledge elements;
program code instructions providing for selection of a plurality of incorporation buttons within the hopper, each of the incorporation buttons being respectively associated with one of the knowledge elements, each of the incorporation buttons being configured to insert the text of the one of the knowledge elements associated therewith into the editable narrative;
program code instructions providing for adding a link to a portion of the editable narrative drafted by the one or more users, the link linking to one or more of the knowledge elements the portion is based upon; and program code instructions for outputting the one or more knowledge elements upon selection of the portion of the editable narrative that is linked thereto.

14. The computer program product of claim 13, further comprising program code instructions for providing for selection of the issue categories from a predefined list.

15. The computer program product of claim 13, further comprising program code instructions providing for linking the knowledge elements to the source material.

16. The computer program product of claim 13, further comprising program code instructions providing for indicating whether the knowledge elements are referenced in the editable narrative.

17. The computer program product of claim 13, wherein the program code instructions for providing access to the categorized knowledge elements comprise program code instructions providing for selection of the issue categories; and
program code instructions for outputting the categorized knowledge elements included in a selected one of the issue categories.

18. The computer program product of claim 13,
wherein the investigative matters are selected from a group consisting of one or more legal investigative matters, one or more corporate investigative matters, one or more academic investigative matters, one or more journalistic investigative matters, one or more forensic accounting investigative matters, and one or more auditing investigative matters, and
wherein the knowledge elements are selected from a group consisting of one or more facts, one or more conclusions, one or more hypotheses, one or more personal thoughts, one or more theories, and one or more conclusions.

19. An apparatus comprising:
means providing for categorization of a plurality of knowledge elements into a plurality of issue categories to produce a plurality of categorized knowledge elements, the knowledge elements each comprising a text drafted by one or more users and derived by the one or more users from one or more source materials;
means providing for association of the one or more source materials and the knowledge elements with one of one or more investigative matters;
means providing an editor configured for drafting of an editable narrative by the one or more users relating to the one of the investigative matters based at least in part on the categorized knowledge elements;
means providing access to the categorized knowledge elements associated with the one of the investigative matters during drafting of the editable narrative by the one or more users via a hopper in which the knowledge elements are organized by the issue categories, the hopper being positioned adjacent the editor such that the knowledge elements are simultaneously viewable with the editor and the editable narrative included therein;

means providing for confirmation and questioning of the knowledge elements;

means providing for selection of a plurality of incorporation buttons within the hopper, each of the incorporation buttons being respectively associated with one of the knowledge elements, each of the incorporation buttons being configured to insert the text of the one of the knowledge elements associated therewith into the editable narrative;

means providing for adding a link to a portion of the editable narrative drafted by the one or more users, the link linking to one or more of the knowledge elements the portion is based upon; and means for outputting the one or more knowledge elements upon selection of the portion of the editable narrative that is linked thereto.

20. The apparatus of claim 19, further comprising means providing for selection of the issue categories from a predefined list.

21. The apparatus of claim 19, further comprising means providing for linking the knowledge elements to the source materials.

22. The apparatus of claim 19, further comprising means providing for indicating whether the knowledge elements are referenced in the editable narrative.

23. The apparatus of claim 19, wherein the means providing access to the categorized knowledge elements comprise means providing for selection of the issue categories; and means for outputting the categorized knowledge element included in a selected one of the issue categories.

24. The apparatus of claim 19, wherein the investigative matters are selected from a group consisting of one or more legal investigative matters, one or more corporate investigative matters, one or more academic investigative matters, one or more journalistic investigative matters, one or more forensic accounting investigative matters, and one or more auditing investigative matters, and wherein the knowledge elements are selected from a group consisting of one or more facts, one or more conclusions, one or more hypotheses, one or more personal thoughts, one or more theories, and one or more conclusions.

* * * * *